US 9,120,462 B2

(12) United States Patent
Jonsson et al.

(10) Patent No.: US 9,120,462 B2
(45) Date of Patent: Sep. 1, 2015

(54) VEHICLE DRIVER ASSIST ARRANGEMENT

(71) Applicant: VOLVO CAR CORPORATION, Gothenburg (SE)

(72) Inventors: Matthias Jonsson, Gothenburg (SE); Per Landfors, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/153,424

(22) Filed: Jan. 13, 2014

(65) Prior Publication Data

US 2014/0207307 A1    Jul. 24, 2014

(30) Foreign Application Priority Data

Jan. 21, 2013    (EP) .................................... 13151987

(51) Int. Cl.
G05D 1/00        (2006.01)
B60R 99/00       (2009.01)
B60W 50/14       (2012.01)

(52) U.S. Cl.
CPC ............... *B60R 99/00* (2013.01); *B60W 50/14* (2013.01); *B60W 2520/10* (2013.01); *B60W 2550/10* (2013.01); *B60W 2550/12* (2013.01); *B60W 2550/142* (2013.01); *B60W 2550/143* (2013.01); *B60W 2550/146* (2013.01); *B60W 2550/402* (2013.01)

(58) Field of Classification Search
CPC ................. B60W 2550/143; B60W 2550/146; B60W 50/14
See application file for complete search history.

(56) References Cited

U.S. PATENT DOCUMENTS

| 6,141,619 | A  | 10/2000 | Sekine |
| 6,424,904 | B1 | 7/2002  | Takahashi et al. |
| 7,039,521 | B2 | 5/2006  | Hortner et al. |
| 7,751,973 | B2 | 7/2010  | Ibrahim |
| 8,180,527 | B2 | 5/2012  | Mueller-Schneiders et al. |

FOREIGN PATENT DOCUMENTS

| DE | 102010027768 | 10/2011 |
| EP | 1087358      | 3/2001  |
| EP | 2048476      | 4/2009  |
| GB | 2413884      | 11/2005 |
| JP | 2008084219   | 4/2008  |
| WO | 03017226     | 2/2003  |

OTHER PUBLICATIONS

Extended European Search Report for EP 13151987.8, Completed by the European Patent Office on May 31, 2013, 8 Pages.

*Primary Examiner* — James Trammell
*Assistant Examiner* — Michael D Lang
(74) *Attorney, Agent, or Firm* — Brooks Kushman P.C.

(57) ABSTRACT

A vehicle driver assist arrangement includes a processor configured to receive road profile data representative of a road profile in front of the vehicle and to receive current vehicle velocity data representative of a current velocity of the vehicle. The processor processes the road profile data to detect if the road in front of the vehicle contains a hidden or at least partially hidden curve, and to communicate with a user interface to issue a warning if a hidden or at least partially hidden curve is detected and the current vehicle velocity exceeds a threshold velocity.

18 Claims, 3 Drawing Sheets

VEHICLE DRIVER ASSIST ARRANGEMENT

CROSS-REFERENCE TO RELATED APPLICATIONS

This application claims foreign priority benefits under 35 U.S.C. §119(a)-(d) to European patent application number EP 13151987.8, filed Jan. 21, 2013, which is incorporated herein by reference in its entirety.

TECHNICAL FIELD

The present disclosure relates to a vehicle driver assist arrangement. The present disclosure also relates a vehicle comprising a vehicle driver assist arrangement and a method of assisting a driver of a vehicle.

BACKGROUND

Vehicle driver assist arrangements, such as curve speed warning arrangements, have been available in cars for some years. Such arrangement may be capable of issuing a warning to a driver of a vehicle if the vehicle approaches a curve with a speed being too high to pass the curve in a pleasant or safe manner. Input to such arrangements may for example be data from a positioning system together with data from an electronic map, and when it is determined that a curve in front of a vehicle, having a certain velocity, either will result in an unpleasant passing or dangerous passing of the curve, a warning will be issued to the driver. Such an arrangement is for example described in the document GB 2413884 A. A problem with such an arrangement is that the issuance of the warning by the arrangement is not very accurate. That is, such systems tends to either issue a warning too often, and thus tends to annoy the driver which may even adjust the arrangement such that the warning will not be issued that often, or may even shut off the arrangement. Those skilled in the art easily recognizes the hazard with such arrangements since the arrangements in a potential dangerous situation may either warn too late or even not warn at all. Thus, there is a need for an arrangement that overcomes the above described shortcomings with the prior-art arrangements to thereby improve driving safety.

SUMMARY

An object of the present disclosure is to improve driving safety of a vehicle.

According to an aspect of the disclosure, the object is achieved by a vehicle driver assist arrangement, comprising processing means, road profile input means, current vehicle velocity input means, and a user interface. The processing means is arranged to communicate with the road profile input means, the current vehicle velocity input means and the user interface. The processing means further being arranged to receive road profile data representative of a road profile in front of the vehicle from the road profile input means, and to receive current vehicle velocity data representative of a current vehicle velocity of the vehicle from the current vehicle velocity input means. The processing means still further being adapted to process the road profile data to detect if the road in front of the vehicle contains a hidden or at least partially hidden curve. The arrangement is adapted to issue a warning, via the user interface, if a hidden or at least partially hidden curve is detected and if the current vehicle velocity exceeds a threshold velocity.

Since the arrangement is adapted to issue a warning if a hidden or at least partially hidden curve is detected and if the current vehicle velocity exceeds a threshold velocity, driving safety is improved.

As a result, the above mentioned object is achieved.

The vehicle referred to herein may be an automobile, truck, buss, or the like. The vehicle referred to herein is the vehicle hosting the arrangement.

According to some embodiments, the processing means are arranged to process the road profile data to calculate a plurality of threshold velocities each being associated with a segment of the road ahead of the vehicle, and to calculate a predicted future vehicle velocity at a predetermined distance from a current vehicle position, or at a predetermined time from a current time, and to compare the current vehicle velocity, and/or the predicted future vehicle velocity, with the threshold velocities, and if the current vehicle velocity, and/or the predicted future vehicle velocity, exceeds one or more of the threshold velocities, determine a first point of activation based at least on the comparison, and to issue the warning when the vehicle passes the first point of activation. In these embodiments, since the warning is issued when the vehicle passes the first point of activation and the first point of activation is determined based at least on a comparison between the current vehicle velocity, and/or the predicted future vehicle velocity, and the plurality of threshold velocities, a predictable arrangement is provided issuing a warning at a determined point of activation. The first point of activation may be determined using inputs not forming part of the comparison such as a distance from the vehicle to a segment of the road ahead of the vehicle, road conditions, driver reaction time, settings in sub-systems, weather conditions, visibility, road markings, type of road, traffic density, a width of the side of the road, speed limits, driving behaviour of the driver, detection of potentially dangerous objects at the side of the road, environment at the side of the road, e.g. the presence of cliffs, rock walls, etc. By using such input in the determining of the first point of activation, the accuracy of the issuing of the warning may be improved. Thereby, the driving safety may be further improved.

According to some embodiments, the processing means are adapted to determine a second point of activation based at least on the comparison, the second point of activation being further down the road in an intended direction of travel than the first point of activation, and if no hidden or at least partially hidden curve is detected, issue a warning when the vehicle passes the second point of activation. Thus, according to these embodiments, the vehicle driver assist arrangement may issue a warning even if/when no hidden or at least partially hidden curve is detected. Accordingly, the arrangement may serve as a curve speed warning system. That is, the arrangement may issue a warning to the driver via the user interface in case the vehicle is approaching a curve with a velocity being too high for passing the curve in a pleasant and/or safe manner, even if no hidden or at least partially hidden curve is detected. Thereby, driving safety is further improved.

According to some embodiments, the calculation of the plurality of threshold velocities is based on the road profile data and limitations in lateral and/or longitudinal acceleration of the vehicle. The road profile data and limitations in lateral and/or longitudinal acceleration of the vehicle indicate if the vehicle is capable of passing a curve in a pleasant and/or safe manner. Thus, since the calculation of the plurality of threshold velocities is based on the road profile data and limitations in lateral and/or longitudinal acceleration of the vehicle, driving safety is improved. Also, according to some embodiments, the calculation of the plurality of threshold velocities may be based on a distance from the vehicle to a segment of the road ahead of the vehicle, road conditions, driver reaction time, settings in sub-systems, etc.

The road profile data may comprise data being representative of the curvature of the road, the slope of the road, the superelevation of the road, presence of intersections, road type, a width of the side of the road, speed limits, detection of potentially dangerous objects at the side of the road, environment at the side of the road, e.g. the presence of cliffs, rock walls, etc. Since the road profile data may comprise such data, and the calculation of the plurality of threshold velocities is based on the road profile data, the calculation of the plurality of threshold velocities may encompass such data. Thereby, the driving safety may be further improved.

According to some embodiments, the road profile data contains slope data being representative of the slope of the road in front of the vehicle, the detection of a hidden curve or at least a partially hidden curve is based on processing of the slope data to detect if a part of the road is hidden or at least partially hidden. The detection may be based on an assumption that a part of the road is hidden from an estimated line of sight of the driver, e.g. by a crest, edge, or a top of a hill. Thus, by using road profile data containing slope data and process this data to detect if a part of the road is hidden or at least partially hidden and to issue a warning to the driver via the user interface if a hidden or at least partially hidden curve is detected and if the current vehicle velocity, and/or the predicted future vehicle velocity, exceeds a threshold velocity, the warning can be issued in an reliable manner to thereby further improve driving safety.

According to some embodiments, the detection of a hidden or at least a partially hidden curve is based on detection of a curve having a progressive curvature. A curve having a progressive curvature is a curve having a radius of curvature that decreases when traveling along the curve. Such curves may be hard to identify by a driver approaching such a curve since a part of the curve may be hidden and/or the driver is not following the curve with his eyes. Thus, issuing a warning to the driver in case of approaching a curve having a progressive curvature may further improve driving safety.

According to some embodiments, the detection of a hidden or at least a partially hidden curve is based on detection of an object obscuring the curve from an estimated line of sight of the driver. Such object may for example be a building, another vehicle, a tree or any other object obscuring the curve from an estimated line of sight of the driver. Thus, by issuing a warning to the driver in case of approaching such a curve, driving safety may be further improved.

According to some embodiments, the detection of a hidden or at least a partially hidden curve is based on illumination conditions and/or the presence of haze or fog. By issuing a warning to the driver in case of approaching a curve being hidden or at least partially hidden due to poor illumination conditions and/or the presence of haze or fog, driving safety may be further improved.

According to some embodiments, the vehicle driver assist arrangement further comprises means for detection of a direction of the driver's line of sight, the detection of a hidden or at least a partially hidden curve being based on the direction of the driver's line of sight. Accordingly, the detection of the driver's line of sight may be used to determine if the driver has seen the curve. In case it is determined that the driver has not seen the curve, the arrangement may be arranged to classify the curve as hidden. Thereby, driving safety may be further improved since the arrangement will issue a warning when it is detected that the driver has not seen the curve.

According to some embodiments, the road profile input means comprises an electronic map and a positioning device. Thus, in such embodiments, an electronic map and a positioning device may provide reliable road profile data representative of a road profile in front of the vehicle.

According to some embodiments, the road profile input means comprises an imaging device. In such embodiments, the imaging device may comprise a camera device, a Light Detection And Ranging (LIDAR) device, and/or a RAdio Detection And Ranging (RADAR) device to thereby provide reliable road profile data representative of a road profile in front of the vehicle.

According to an aspect of the disclosure, the object is achieved by a method of assisting a driver of a vehicle using processing means, road profile input means, current vehicle velocity input means, and a user interface, the processing means being arranged to communicate with the road profile input means, the current vehicle velocity input means and the user interface, the method comprising;

receiving, in the processing means, road profile data representative of a road profile in front of the vehicle from the road profile input means and, receiving, in the processing means, current vehicle velocity data representative of a current vehicle velocity of the vehicle from the current vehicle velocity input means, processing the road profile data to detect if the road in front of the vehicle contains a hidden or at least partially hidden curve, and issuing a warning, via the user interface, if a hidden or at least partially hidden curve is detected and if the current vehicle velocity exceeds a threshold velocity Again, since a warning is issued if a hidden or at least partially hidden curve is detected and if the current vehicle velocity exceeds a threshold velocity, driving safety is improved.

According to some embodiments, the method further comprises;

processing the road profile data to calculate a plurality of threshold velocities each being associated with a segment of the road ahead of the vehicle, and calculating a predicted future vehicle velocity at a predetermined distance from a current vehicle position, or at a predetermined time from a current time, and comparing the current vehicle velocity, and/or the predicted future vehicle velocity, with the threshold velocities, and if the current vehicle velocity, and/or the predicted future vehicle velocity, exceeds one or more of the threshold velocities, determining a first point of activation based at least on the comparison, and issuing the warning when the vehicle passes the first point of activation.

In such embodiments, since the warning is issued when the vehicle passes the first point of activation and the first point of activation is determined based at least on a comparison between the current vehicle velocity and/or the predicted future vehicle velocity and the plurality of threshold velocities, a predictable method is provided issuing a warning at a determined point of activation. Thereby, driving safety may be further improved. The first or second point of activation may be determined using inputs not forming part of the comparison, such as distance from the vehicle to a segment of the road ahead of the vehicle, road conditions, driver reaction time, settings in sub-systems, weather conditions, visibility, road markings, type of road, traffic density, a width of the side of the road, speed limits, driving behaviour of the driver, detection of potentially dangerous objects at the side of the road, environment at the side of the road, e.g the presence of cliffs, rock walls, etc. By using such input in the determining of the first or second point of activation, accuracy of the issuing of the warning may be improved. Thereby, the driving safety may be further improved.

Further features of, and advantages with, the present disclosure will become apparent when studying the appended claims and the following detailed description. Those skilled in the art will realize that different features of the present disclosure may be combined to create embodiments other than those described in the following, without departing from the scope of the present disclosure, as defined by the appended claims.

BRIEF DESCRIPTION OF THE DRAWINGS

The various aspects of the disclosure, including its particular features and advantages, will be readily understood from the following detailed description and the accompanying drawings, in which.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

The present disclosure will now be described more fully with reference to the accompanying drawings, in which example embodiments are shown. However, this disclosure should not be construed as limited to the embodiments set forth herein. Disclosed features of example embodiments may be combined as readily understood by one of ordinary skill in the art to which this disclosure belongs. Like numbers refer to like elements throughout.

Well-known functions or constructions will not necessarily be described in detail for brevity and/or clarity.

Figure 1:
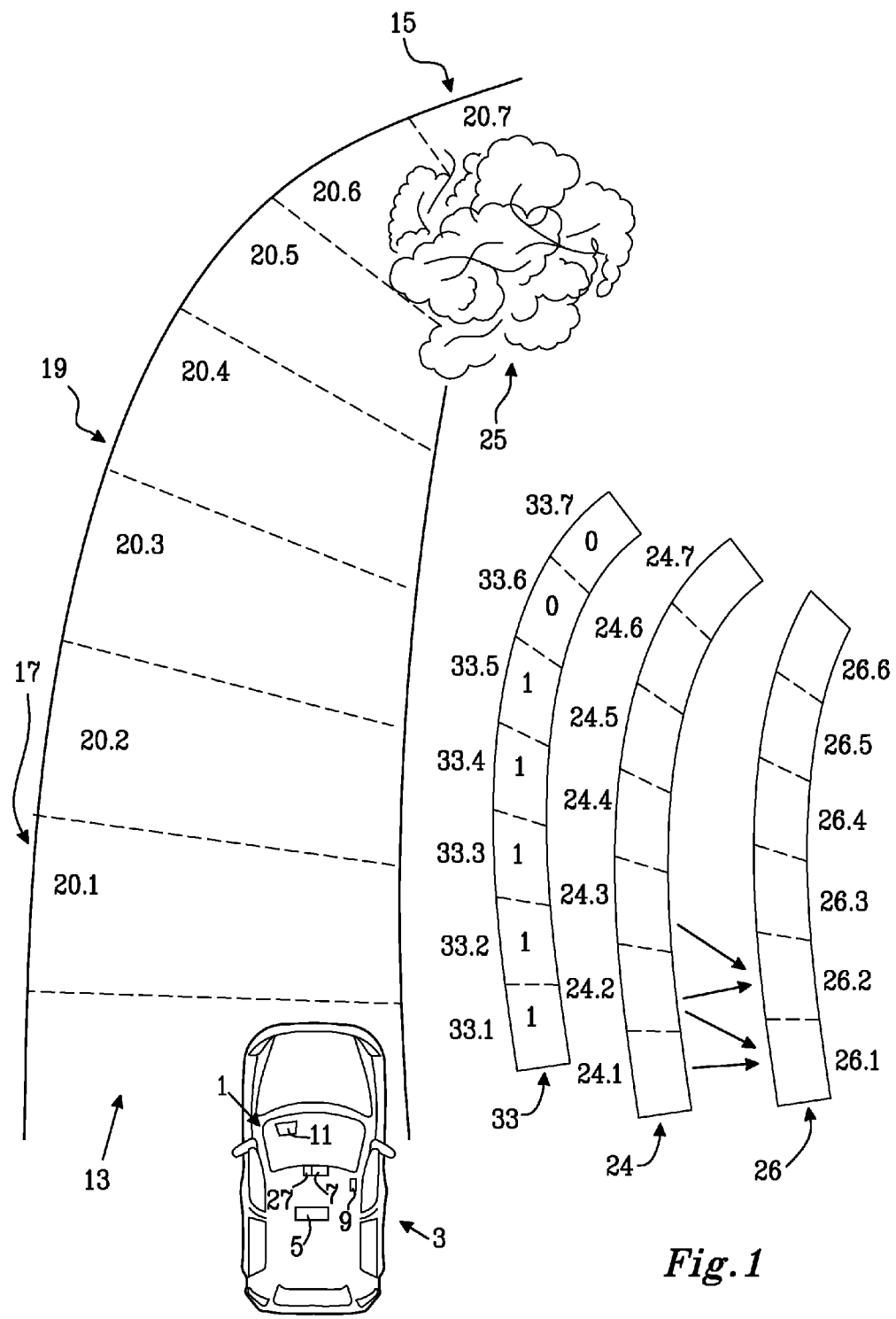
FIG. 1 illustrates a vehicle 3 driver assist arrangement 1 according to some embodiments.

FIG. 1 illustrates a vehicle 3 driver assist arrangement 1. The arrangement 1 comprises processing means 5, road profile input means 7, current vehicle velocity input means 9, and a user interface 11. The processing means 5 are arranged to communicate with the road profile input means 7, the current vehicle velocity input means 9 and the user interface 11. The processing means 5 are further arranged to receive road profile data, representative of a road profile in front of the vehicle 3, from road profile input means 7, and to receive current vehicle velocity data representative of a current velocity of the vehicle 3 from the current vehicle velocity input means 9. The processing means 5 are still further adapted to process the road profile data to detect if the road 13 in front of the vehicle 3 contains a hidden or at least partially hidden curve 15. The arrangement 1 is adapted to issue a warning, via the user interface 11, if a hidden or at least partially hidden curve 15 is detected and if the current vehicle velocity exceeds a threshold velocity.

The threshold velocity may be based on the road profile data and limitations in lateral and/or longitudinal acceleration of the vehicle 3, and/or may be predetermined to a value being low, e.g. a value merely indicating that the vehicle 3 is moving.

The road profile data may comprise data being representative of a curvature of the road 13, a slope of the road 13, objects 25 obscuring the road 13, illumination conditions, the presence of haze, fog, snow- and/or rain-fall, and/or speed limits of the road 13 in front of the vehicle 3, superelevation, banking of the road 3, presence of intersections, road type, a width of the side of the road, detection of potentially dangerous objects at the side of the road 13, environment at the side of the road 13, e.g. the presence of cliffs, rock walls, etc. Thus, by processing of such road profile data, a more accurate issuing and determining of the first point of activation can be achieved. Thereby, the driving safety is improved.

The processing means 5 may comprise one or more processing units, such as one or more processors, being capable of processing the road profile data, to thereby detect a hidden or at least partially hidden curve 15.

The road profile input means 7 may comprise means to detect and/or recognise the road profile of the road 13 in front of the vehicle 3. The road profile input means 7 may comprise an electronic map and a positioning device such as a spaced based satellite navigation system such as a Global Positioning System GPS, The Russian GLObal NAvigation Satellite System (GLONASS), European Union Galileo positioning system, Chinese Compass navigation system, or Indian Regional Navigational Satellite System. In such embodiments, the positioning device may provide a position of the vehicle 3 and the processing means 5 may be adapted to process data from the electronic map to detect if the road 13 in front of the vehicle 3 contains a hidden or at least partially hidden curve 15. As an alternative, or in combination, the electronic map may comprise information associated with curves on the map, providing information about whether a curve is hidden or not.

As an alternative, or in combination with the above, the road profile input means 7 may comprise an imaging device, such as a camera device. In such embodiments, the imaging device may form part of a camera system and/or an imaging system device being capable of capturing a digital image representation of the environment in front of the vehicle 3, to thereby provide the road profile input data. The processing means 5 may be adapted to process the digital image representation of the environment in front of the vehicle 3, captured by the imaging device, to thereby detect if the road 13 in front of the vehicle 3 contains a hidden or at least partially hidden curve 15. The camera may be a camera capable of capturing an image of visible light and/or a camera capable of capturing an image of invisible light, such as an infrared camera. The imaging device may comprise one or more cameras. The imaging device may be positioned in an area near a rear view mirror of the vehicle 3, similar to the position of the road profile input means 7 in FIG. 1. However, the imaging device may be positioned at any other position at the vehicle 3 allowing the imaging device to capture a digital image representation of the environment in front of the vehicle 3. Such position may for example be in the front of the vehicle 3.

Also, as an alternative, or in combination with the above, the imaging device may comprise a Light Detection And Ranging (LIDAR) device, and/or a RAdio Detection And Ranging (RADAR) device to thereby provide reliable road profile data representative of a road profile in front of the vehicle.

The current vehicle velocity means 9 comprises means for providing current vehicle velocity data being representative of a current velocity of the vehicle 3 hosting the arrangement 1, such as a sensor, a positioning system, or the like.

The user interface 11 may comprise a display, a speaker, and/or an arrangement 1 being capable of providing a haptic signal or any other device being capable of issuing a warning to the driver. The warning issued to the driver may comprise information such as a distance to the curve, such as a graphical presentation of such information displayed on a display. Also, a speaker voice may provide such information via a speaker. As an alternative, or in combination, the warning issued may comprise a symbol being displayed, indicating that the vehicle 3 is approaching a hidden curve 15, such as a flashing symbol being displayed in the instrument panel.

In FIG. 1 segments 20.1-20.7 of the road 13 ahead of the vehicle 3 are illustrated. According to some embodiments, the processing means 5 are arranged to process the road profile data to calculate a plurality of threshold velocities, each being associated with a segment 20.1-20.7 of the road 13 ahead of the vehicle 3, and to calculate a predicted future vehicle velocity at a predetermined distance from a current vehicle position, or at a predetermined time from a current time, and to compare the current vehicle velocity, and/or the predicted future vehicle velocity, with the threshold velocities, and if the current vehicle velocity, and/or the predicted future vehicle velocity, exceeds one or more of the threshold velocities, determine a first point of activation 17 based at least on the comparison, and to issue the warning when the vehicle 3 passes the first point of activation 17. The processing means 5 may calculate the predicted future vehicle velocity from a current vehicle velocity and a previous vehicle velocity. Thereby, it can recognize whether the vehicle is accelerating and/or decelerating and calculate a value of vehicle acceleration or deceleration. With the value of vehicle acceleration or deceleration and the current vehicle velocity, the predicted future vehicle velocity can be calculated at a predetermined distance from a current vehicle position, or at a predetermined time from a current time. Also, data from an accelerometer and/or gyroscope, which may be comprised in the arrangement 1, may be used to measure vehicle acceleration and/or deceleration, to thereby provide values by which the predicted future vehicle velocity can be calculated. In embodiments wherein the predicted future vehicle velocity is calculated at a predetermined distance from a current vehicle position, the predetermined distance may be predetermined to a distance being dependent on vehicle velocity such that a higher vehicle velocity provides a greater distance and a lower vehicle velocity provides a shorter distance. In embodiments wherein a predicted future vehicle velocity is calculated at a predetermined time from a current time, the predetermined time may be predetermined to a value similar to an estimated driver reaction time, e.g. 1.5 seconds.

In embodiments wherein the processing means 5 are arranged to calculate a predicted future vehicle velocity at a predetermined distance from a current vehicle position, or at a predetermined time from a current time, and to compare the predicted future vehicle velocity, with the threshold velocities, and if the predicted future vehicle velocity, exceeds one or more of the threshold velocities, determine a first point of activation 17 based at least on the comparison, and to issue the warning when the vehicle 3 passes the first point of activation 17, a more accurate issuing of the warning can be achieved since vehicle acceleration and deceleration is taken into account. That is, if the vehicle is accelerating, the predicted future vehicle velocity will become higher than in case of an vehicle deceleration, and thus, given a certain road profile and a given current vehicle velocity, the driver assist arrangement will more likely issue a warning. This further improves driving safety since a vehicle accelerating when approaching a curve is a more dangerous situation than a vehicle decelerating or keeping a constant velocity when approaching a curve.

A segment 20.1-20.7 of the road 13 in front of the vehicle 3 is an imaginary division of the road 13 in front of the vehicle 3. Each segment 20.1-20.7 may have a predetermined length, e.g. 5.5 meters. The calculation of the plurality of threshold velocities may be based on the road profile data and limitations in lateral and/or longitudinal acceleration of the vehicle 3. That is, the processing means 5 may divide the road 13 in front of the vehicle 3 into segments 20.1-20.7, and calculate a threshold velocity for each segment 20.1-20.7, e.g. based on the road profile data and limitations in lateral and/or longitudinal acceleration of the vehicle 3. The processing means 5 may compare the current vehicle velocity, and/or the predicted future vehicle velocity, with each of the threshold velocities associated with segments 20.1-20.7 up to a certain distance in front of the vehicle 3. This distance may be predetermined, e.g. 500 meters and/or may be dependent on the current vehicle velocity e.g. such that the distance is longer in case of a high current vehicle velocity and shorter in case of a low current vehicle velocity. The processing means 5 may determine a first point of activation 17, based at least on the comparison, and to issue the warning when the vehicle 3 passes the first point of activation 17. Since the warning is issued when the vehicle 3 passes the first point of activation 17, the warning may be issued at an appropriate distance to the hidden or at least partially hidden curve 15.

Determining of the first point of activation 17 may further be based inputs representative of a distance from the vehicle 3 to a segment 20.1-20.7 of the road 13 ahead of the vehicle 3, vehicle velocity, road conditions, driver reaction time, settings in sub-systems, weather conditions, visibility, road markings, type of road, traffic density, driving behaviour of the driver, a width of the side of the road, speed limits, detection of potentially dangerous objects at the side of the road, environment at the side of the road, e.g. the presence of cliffs, rock walls, etc. By using such input in the determining of the first point of activation, accuracy of the issuing of the warning may be improved. Thereby, the driving safety may be further improved. For example, in case a road mark is detected indicating an overtaking ban, such as a solid line in the middle of the road, the first point of activation can be determined to a point being closer to the vehicle, and thus further from a curve. Likewise, in case of detection of badly worn road markings, or lack of road markings, the first point of activation can be determined to a point being closer to the vehicle, and thus further from a curve. Further, the first point of activation can be determined at a point being closer to the vehicle in case of a driver having a calm driving pattern than in case of a driver having an aggressive driving pattern.

Issuance of the warning may be performed in dependence of a severity of a driving situation. That is, issuance of the warning may be performed in dependence of the comparison between the current vehicle velocity and/or the predicted future vehicle velocity and the threshold velocities, such that a certain degree of warning is performed with regard to the displaying of symbols and/or displaying of graphical information and/or issuance of warning sounds, in case the comparison indicates a vehicle velocity, and/or a predicted future vehicle velocity, being significantly higher than one or more of the threshold velocities. Also, the degree of the warning may be performed in dependence of a distance to a segment of the road 13 being associated with a threshold velocity, such that a certain degree of warning is performed with regard to the displaying of symbols and/or displaying of graphical information and/or issuance of warning sounds, in case the vehicle 3 is at a certain distance to the segment. In such embodiments, a degree of warning may be such that a low degree of warning is performed when the distance to a segment is long and as the vehicle 3 is approaching the segment, i.e. the distance to the segment becomes shorter, the degree of warning is increased. Thereby, warning is performed in dependence of a severity of a driving situation. Due to the warning being performed in dependence of a severity of a driving situation, driving safety may be further improved.

According to some embodiments, the plurality of threshold velocities, each being associated with a segment 20.1-20.7 of the road 13 ahead of the vehicle 3, may be provided in the form of a threshold velocity vector 24, containing threshold velocity vector elements 24.1-24.7, with values being representative of the plurality of threshold velocities. Each threshold velocity vector element 24.1-24.7 is associated with a segment 20.1-20.7 of the road 13. In FIG. 1, the threshold velocity vector element 24.1 is associated with road segment 20.1, the threshold velocity vector element 24.2 is associated with road segment 20.2, the threshold velocity vector element 24.3 is associated with road segment 20.3, and so forth.

According to some embodiments, the processing means 5 are adapted to determine a second point of activation 19, based at least on the comparison. The second point of activation 19 being further down the road 13 in an intended direction of travel than the first point of activation 17. If no hidden or at least partially hidden curve 15 is detected, the warning is issued when the vehicle 3 passes the second point of activation 19. The warning issued if no hidden or at least partially hidden curve 15 is detected may be different from the warning issued if a hidden or at least partially hidden curve 15 is detected. That is, the warning issued if no hidden or at least partially hidden curve 15 is detected may be issued such that a driver may distinguish between the warnings, e.g. by means of a symbol displayed, or a sound/speaker voice, being distinguishable from the warning being issued in case a hidden or at least partially hidden curve 15 is detected. In these embodiments, the driver will receive a warning in case of approaching a curve with too high velocity, even if the curve is not hidden and the driver may be able to separate between hidden and unhidden curves due to the different warnings being issued. Thus, in case no hidden or partially hidden curve 15 is detected, the arrangement 1 may function as an ordinary curve speed arrangement, as previously known in the art. Since the driver receives a warning in case of approaching a curve with too high velocity, even if the curve is not hidden, driving safety is further improved. Also, since the second point of activation 19 is further down the road 13, in an intended direction of travel, than the first point of activation 17, the driver will receive a warning at appropriate distance with regard to the type of curve being approached, since a hidden curve may pose a greater hazard to driving safety than a curve being visible to the driver.

According to some embodiments, the processing means 5 are adapted to determine further points of activations, such as a third, a forth and/or a fifth point of activation based at least on the comparison. In such embodiments, these points of activation may differ from the first and second point of activation to provide different levels of warnings and/or a warning being issued stepwise.

The first and/or the second point of activation 17, 19 may coincide with and/or be associated with one of the segments 20.1-20.7. In such embodiments, a warning may be issued when the vehicle 3 passes or enters such a segment 20.7-20.7 of the road 13.

According to some embodiments, the first and/or the second point of activation 17, 19 may be determined assessing a future deceleration process. That is, the first and/or the second point of activation 17, 19 may e.g. be determined by comparing the threshold velocities and estimate a necessary future deceleration in order to adopt a suitable velocity. This may be achieved using an acceleration vector 26. The acceleration vector 26 may comprise acceleration vector elements 26.1-26.7, each element 26.1-26.7 being associated with two threshold velocity vector elements 24.1-24.7, in the sense that a value of an acceleration vector element is representative of the relative difference between values of the two adjacent threshold velocity vector elements. In FIG. 1, the acceleration vector element 26.1 has a value being representative of the relative difference between the threshold velocity in threshold velocity vector element 24.1 and the threshold velocity in threshold velocity vector element 24.2. The result given in the acceleration vector element 26.1 indicates whether the road 13 admits acceleration or deceleration with regard to limitations in lateral and/or longitudinal acceleration of the vehicle 3. A positive value indicates that limitations in lateral and/or longitudinal acceleration of the vehicle 3 admits an acceleration of the vehicle 3 in the intended direction of travel, whereas a negative value indicates that limitations in lateral and/or longitudinal acceleration of the vehicle 3 implies that deceleration must be performed on the associated segment of the road 13 in order to pass a curve safely. Accordingly, the processing means 5 may perform a comparison between values of the acceleration vector 26.1-26.7 and the current vehicle velocity, and/or the acceleration of the vehicle 3, and/or the predicted future vehicle velocity, such that the first or second point of activation 17, 19 is moved or determined to a location being closer to the vehicle 3, in an intended direction of travel, in case the comparison indicates any reduction in driving safety. For example, if the driver forces the vehicle 3 to accelerate while an element of the acceleration vector 26 indicates that two adjacent segments of the road 13 implies deceleration, issuance of the warning may be performed at a greater distance from the two segments, e.g. at a greater distance from a curve.

According to some embodiments, detection of a hidden curve 15 or at least a partially hidden curve 15 is based on detection of an object 25 obscuring the curve 15 from an estimated line of sight of the driver. The object 25 is illustrated as a tree in FIG. 1. However, the object 25 may be any other type of object obscuring the curve 13 from an estimated line of sight of the driver, such as a building, another vehicle, etc. The detection of the object obscuring the curve 15 from an estimated line of sight of the driver may be performed by means of an imaging device, such as a camera device a Light Detection And Ranging (LIDAR) device, and/or a RAdio Detection And Ranging (RADAR) device. Thus, the processing means 5 may, in such embodiments, may be adapted to process a digital image representation of the environment in front of the vehicle 3, captured by the imaging device, to thereby detect if a curve 15 in front of the vehicle 3 is hidden or at least partially hidden by an object 25 obscuring the curve 15 from an estimated line of sight of the driver.

According to some embodiments, the processing means 5 may process the road profile input data to detect if a segment 20.1-20.7 of the road 13 in front of the vehicle 3 contains a hidden or at least partially hidden part 15 of the road 13 and to set values of visibility vector elements 33.1-33.7 of a visibility vector 33 such that the values indicates if a segment 20.1-20.7 of the road 13 associated with respective visibility vector elements 33.1-33.7 comprises a hidden part of the road 13, e.g. in the form of values 1 (one) and 0 (zeros) wherein the value 1 indicates that the segment is visible to the driver and the value 0 (zero) indicates that the segment is hidden to the driver. In FIG. 1, the visibility vector elements 33.6 and 33.7 are illustrated as having a value of 0 (zero), since visibility vector elements 33.6 and 33.7 are associated with segments 20.6 and 20.7 of the road 13 being hidden from an estimated line of sight of the driver, due to the object 25 obscuring the curve 15, whereas the visibility vector elements 33.1-33.5 are illustrated as having a value of 1, since visibility vector elements 33.1-33.5 are associated with segments 20.1- 20.5 of the road 13 being visible from an estimated line of sight of the driver. Thus, the processing means 5 may compare values of the visibility vector 33 with the road profile data and if one or more segments of the road 13 in front of the vehicle 3 comprises a hidden or at least partially hidden curve 15, issue the warning and/or determine the first point of activation 17.

For example, if the vehicle 3 is approaching a curve with a velocity exceeding, and/or a predicted future vehicle velocity exceeding, one or more of the plurality of threshold velocity values, e.g. given in the threshold velocity vector 24, the processing means 5 may determine a first point of activation 17 in case the road 13 in front of the vehicle 3 contains a hidden or at least partially hidden curve 15, e.g. the visibility vector indicates that a part of the road 13, containing a curve, is hidden from an estimated line of sight of the driver, whereas the processing means 5 may determine a second point of activation 19 in case the road 13 in front of the vehicle 3 contains a visible curve, e.g. the visibility vector indicates that a part of the road, containing a curve, is visible from an estimated line of sight of the driver.

Further, according to some embodiments, detection of a hidden or at least a partially hidden curve 15 may be based on illumination conditions and/or the presence of haze or fog and/or snow- and/or rain-fall. The illumination conditions and/or the presence of haze or fog and/or snow -and/or rain-fall may, according to some embodiments, be detected using the imaging device being comprised in the road profile input means 7. Thus, the processing means 5 may, in such embodiments, be adapted to process a digital image representation of the environment in front of the vehicle 3 captured by the imaging device to thereby determine illumination condition and/or the presence of haze or fog and/or snow- and/or rain-fall on the road 13 in front of the vehicle 3. As an alternative, or in combination with the above, a sensor or the like, appropriate for the purpose, may be used to determine illumination conditions and/or the presence of haze or fog and/or snow- and/or rain-fall.

According to some embodiments, the arrangement 1 may further comprise means 27 for detection of a direction of the driver's line of sight, the detection of a hidden or at least a partially hidden curve 15 being based on the direction of the driver's line of sight. The means 27 for detection of a direction of the driver's line of sight may comprise a camera, or the like, monitoring movement of and/or direction of the driver's eyes and/or head. Thereby, the direction of the driver's line of sight may be determined and may be used by the arrangement 1 to determine whether the driver has seen a curve or not. In these embodiments, the processing means 5 may be adapted to determine a first or second point of activation 17, 19 at a point closer down the road 13 in an intended direction of travel, in case it is determined that the driver has not seen the curve, than in case it is determined that the driver has seen the curve. In doing so, driving safety may be further improved, since the driver will receive the warning at a point being further from the curve if he or she looks in a direction not being towards the curve.

Figure 2:
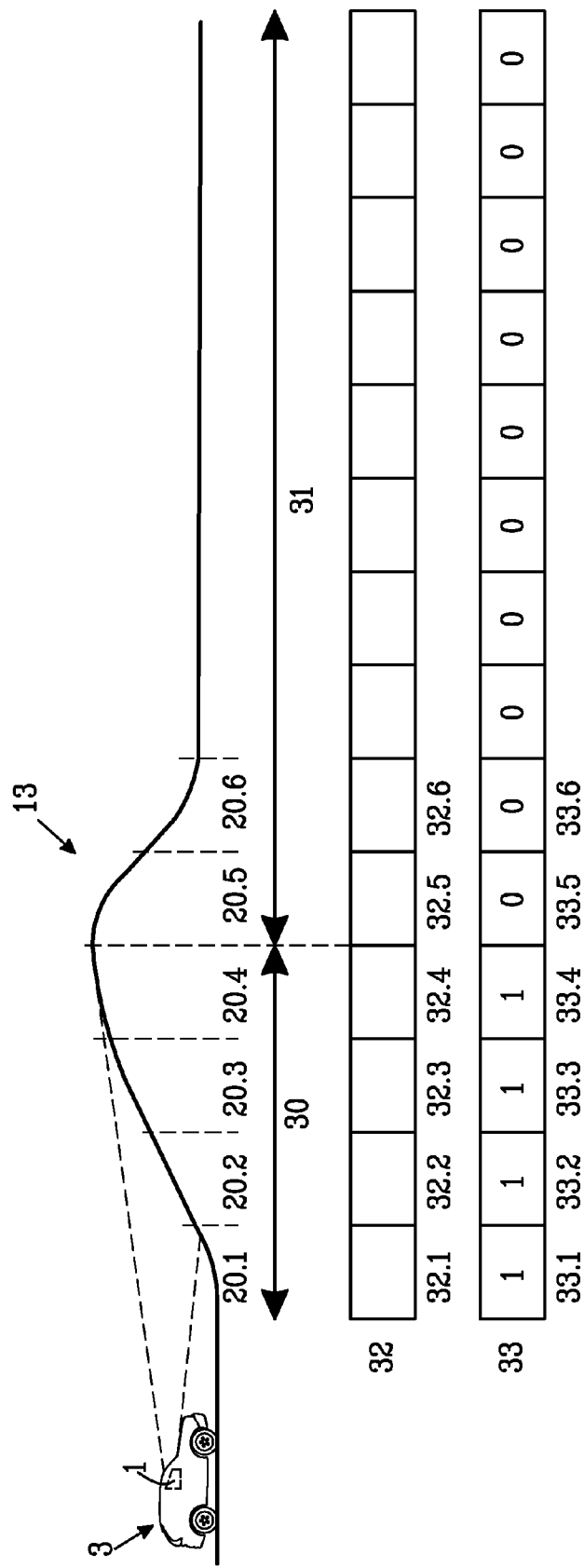
FIG. 2 illustrates a vehicle 3 comprising a vehicle driver assist arrangement 1 according to some embodiments.

FIG. 2 illustrates a vehicle 3 comprising a vehicle driver assist arrangement 1 according to some embodiments. The vehicle 3 is traveling along a road 13. Due to a geographical formation of the road 13, a driver of the vehicle 3 is able to see the part 30 of the road 13 while a part 31 of the road 13 is hidden from an estimated line of sight of the driver. According to some embodiments, the road profile data contains slope data being representative of the slope of the road 13 in front of the vehicle 3, the detection of a hidden curve or at least a partially hidden curve is based on processing of the slope data to detect if a part of the road 13 is hidden or at least partially hidden. Thus, the slope data may indicate if a part of the road 13 is hidden from an estimated line of sight of the driver, e.g. if a part of the road 13 is hidden by a crest, edge, a top of a hill, etc. The slope data may be provided in the form of a slope data vector 32, containing slope data vector elements 32.1-32.6 with values representative of the slope of the road 13 in front of the vehicle 3, either calculated by the processing means 5 or retrieved by the processing means 5 from the road profile input data. In such embodiments, the processing means 5 may process the slope data vector 32 to create a visibility vector 33 containing visibility vector elements 33.1-33.6 with values indicating if segments associated with respective vector elements comprises a hidden part of the road 13, e.g. in the form of values 1 (one) and 0 (zeros) wherein the value 1 indicates that the segment is visible to the driver and the value 0 (zero) indicates that the segment is hidden to the driver. In FIG. 2, the visibility vector elements 33.5-33.6 are illustrated as having a value of 0 (zero), since visibility vector elements 33.5 and 33.6 are associated with a segments 20.5 and 20.6 of the road 13 being hidden from an estimated line of sight of the driver, whereas the visibility vector elements 33.1-33.4 are illustrated as having a value of 1, since visibility vector element 33.1-33.4 are associated with segments 20.1-20.4 of the road 13 being visible from an estimated line of sight of the driver. Also, according to some embodiments, the visibility vector 33 may not be created by the processing means 5 by a processing of the slope data vector 32. Instead, the visibility vector 33 may already be comprised in the road profile input data.

Figure 3:
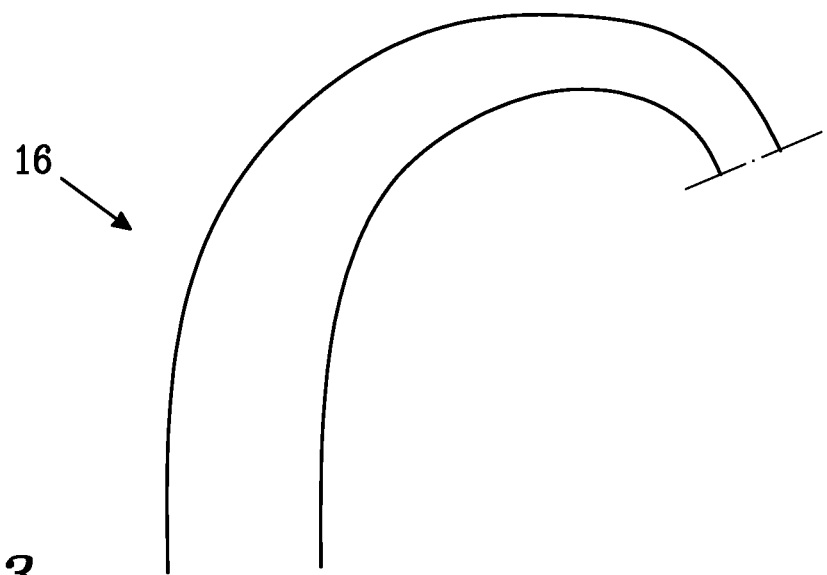
FIG. 3 illustrates a curve 16 having a progressive curvature.

FIG. 3 illustrates a curve 16 having a progressive curvature. According to some embodiments, the detection of a hidden curve or at least a partially hidden curve is based on detection of a curve 16 having a progressive curvature. A curve having a progressive curvature is a curve having a radius of curvature that decreases when traveling along the curve. A curve having a progressive curvature may pose a greater hazard to driving safety than a curve having a continuous or increasing radius of curvature since a curve having a progressive curvature admits a higher vehicle velocity in the beginning of the curve as compared to the end of the curve. Therefore, it may be difficult for a driver to determine an appropriate entrance velocity in such curve. Also, such curves may be hard to identify by a driver approaching a curve since a part of the curve may be hidden and/or the driver not following the curve with his eyes. The detection of a curve having a progressive curvature may be performed by processing road profile input data. In embodiments wherein the road profile input means 7 comprises an electronic map and a positioning device, data from the electronic map may be processed in order to detect curves having a progressive curvature.

According to some embodiments, data from an accelerometer and/or gyroscope, which may be comprised in the arrangement 1, may be used to detect if the road 13 is inclined, is super elevated, or has a slope. This information may be used to verify road profile data and/or modify the first and/or second point of activation 17, 19.

Figure 4:
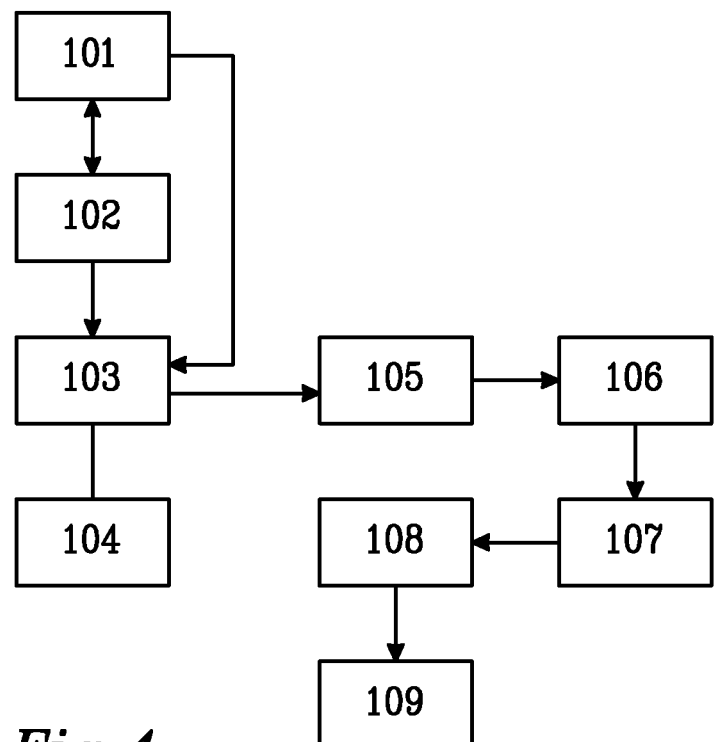
FIG. 4 illustrates a method of assisting a driver of a vehicle.

FIG. 4 illustrates a method of assisting a driver of a vehicle using processing means, road profile input means, current vehicle velocity input means, and a user interface, the processing means are arranged to communicate with the road profile input means, the current vehicle velocity input means and the user interface, the method comprising;

receiving 101, in the processing means, road profile data representative of a road profile in front of the vehicle from the road profile input means and, receiving 102, in the processing means, current vehicle velocity data representative of a current vehicle velocity of the vehicle from the current vehicle velocity input means, processing 103 the road profile data to detect if the road in front of the vehicle contains a hidden or at least partially hidden curve, and issuing 104 a warning, via the user interface, if a hidden or at least partially hidden curve is detected and if the current vehicle velocity exceeds a threshold velocity.

Again, since a warning is issued if a hidden or at least partially hidden curve is detected and if the current vehicle velocity exceeds a threshold velocity, driving safety is improved.

According to some embodiments, the method further comprises;

processing 105 the road profile data to calculate a plurality of threshold velocities each being associated with a segment of the road ahead of the vehicle, and calculating 106 a predicted future vehicle velocity at a predetermined distance from a current vehicle position, or at a predetermined time from a current time, and comparing 107 the current vehicle velocity, and/or the predicted future vehicle velocity, with the threshold velocities, and if the current vehicle velocity, and/or the predicted future vehicle velocity, exceeds one or more of the threshold velocities, determining 108 a first point of activation based at least on the comparison, and issuing 109 the warning when the vehicle passes the first point of activation.

In such embodiments, since the warning is issued when the vehicle passes the first point of activation and the first point of activation is determined based at least on a comparison between the current vehicle velocity, and/or the predicted future vehicle velocity, and the plurality of threshold velocities, a predictable method is provided issuing a warning at a determined point of activation. Thereby, driving safety may be further improved. The first point of activation may be determined using inputs not forming part of the comparison, such as distance from the vehicle to a segment of the road ahead of the vehicle, road condition, driver reaction time, settings in sub-systems, weather conditions, visibility, road markings, type of road, traffic density, a width of the side of the road, speed limits, driving behaviour of the driver, detection of potentially dangerous objects at the side of the road, environment at the side of the road, e.g. the presence of cliffs, rock walls, etc.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle driver assist arrangement comprising:
  road profile input means for providing road profile data representative of a profile of a road in front of a vehicle;
  current vehicle velocity means for providing current vehicle velocity data representative of a current velocity of the vehicle;
  a user interface; and
  processing means adapted to communicate with the road profile input means, the current vehicle velocity means and the user interface, the processing means configured to receive road profile data representative of a road profile in front of the vehicle from the road profile input means, and to receive current vehicle velocity data representative of a current velocity of the vehicle from the current vehicle velocity means;
  wherein the processing means is further configured to process the road profile data to detect if the road in front of the vehicle contains a curve which is hidden or at least partially hidden from an estimated sight of a driver, and to communicate with the user interface to issue a warning if a hidden or at least partially hidden curve is detected and if the current vehicle velocity exceeds a threshold velocity, and wherein the road profile data contains slope data representative of the slope over the road in front of the vehicle, and the detection of a hidden or at least a partially hidden curve is based on processing of the slope data to detect if a part of the road is hidden or at least partially hidden.

2. The vehicle driver assist arrangement according to claim 1 wherein the processing means are arranged to process the road profile data to calculate a plurality of threshold velocities each being associated with a segment of the road ahead of the vehicle, and to calculate a predicted future vehicle velocity at a predetermined distance from a current vehicle position, or at a predetermined time from a current time, and to compare the current vehicle velocity and/or the predicted future vehicle velocity with the threshold velocities and, if the current vehicle velocity and/or the predicted future vehicle velocity exceeds one or more of the threshold velocities, determine a first point of activation based at least on the comparison, and to communicate with the user interface to issue a warning when the vehicle passes the first point of activation.

3. The vehicle driver assist arrangement according to claim 2 wherein the processing means are adapted to determine a second point of activation based at least on the comparison, the second point of activation being further down the road in an intended direction of travel than the first point of activation, and if no hidden or at least partially hidden curve is detected, communicate with the user interface to issue a warning when the vehicle passes the second point of activation.

4. The vehicle driver assist arrangement according to claim 2 wherein the calculation of the plurality of threshold velocities is based on the road profile data and limitations in lateral and/or longitudinal acceleration of the vehicle.

5. The vehicle driver assist arrangement according to claim 1 wherein the detection of a hidden or at least a partially hidden curve is based on detection of a curve having a progressive curvature.

6. The vehicle driver assist arrangement according to claim 1 wherein the detection of a hidden or at least a partially hidden curve is based on detection of an object obscuring the curve from an estimated line of sight of the driver.

7. The vehicle driver assist arrangement according to claim 1 wherein the detection of a hidden or at least a partially hidden curve is based on illumination conditions and/or the presence of haze or fog.

8. The vehicle driver assist arrangement according to claim 1 further comprising means for detection of a direction of a line of sight of the driver, and wherein the detection of a hidden or at least a partially hidden curve is based on the direction of the driver line of sight.

9. The vehicle driver assist arrangement according to claim 1 wherein the road profile input means comprises an electronic map and a positioning device.

10. The vehicle driver assist arrangement according to claim 1 wherein the road profile input means comprises an imaging device.

11. A vehicle comprising a driver assist arrangement according to claim 1.

12. A method of assisting a driver of a vehicle using processing means, road profile input means, current vehicle velocity means, and a user interface, the processing means being arranged to communicate with the road profile input means, the current vehicle velocity input means and the user interface, the method comprising;
  receiving, in the processing means, road profile data representative of a road profile in front of the vehicle from the road profile input means, the road profile data containing slope data representative of a slope of the road in front of the vehicle;
  receiving, in the processing means, current vehicle velocity data representative of a current vehicle velocity of the vehicle from the current vehicle velocity input means;
  processing the slope data of the road profile data to detect if the road in front of the vehicle contains a curve which is hidden or at least partially hidden from an estimated line of sight of the driver; and
  issuing a warning, via the user interface, when a hidden or at least partially hidden curve is detected and the current vehicle velocity exceeds a threshold velocity.

13. The method of assisting a driver of a vehicle according to claim 12 further comprising:
  processing the road profile data to calculate a plurality of threshold velocities each being associated with a segment of the road ahead of the vehicle;
  calculating a predicted future vehicle velocity at a predetermined distance from a current vehicle position, or at a predetermined time from a current time;
  comparing the current vehicle velocity, and/or the predicted future vehicle velocity, with the threshold velocities; and
  when the current vehicle velocity, and/or the predicted future vehicle velocity, exceeds one or more of the threshold velocities, determining a first point of activation based at least on the comparison and issuing the warning when the vehicle passes the first point of activation.

14. A vehicle driver assist arrangement comprising:
  a road profile input system for providing road profile data representative of a profile of a road in front of a vehicle; and
  a processor configured to receive road profile data representative of a road profile in front of the vehicle from the road profile input means, and to receive current vehicle velocity data representative of a current velocity of the vehicle;
  wherein the processor is further configured to process the road profile data to detect if the road in front of the vehicle contains a curve which is hidden or at least partially hidden from an estimated line of sight of a driver, and to communicate with a user interface to issue a warning if a hidden or at least partially hidden curve is detected and the current vehicle velocity exceeds a threshold velocity, and wherein the road profile data contains slope data representative of the slope of the road in front of the vehicle, and the detection of a hidden or at least a partially hidden curve is based on processing of the slope data to detect when a part of the road is hidden or at least partially hidden.

15. The vehicle driver assist arrangement according to claim 14 wherein the processor is arranged to process the road profile data to calculate a plurality of threshold velocities each being associated with a segment of the road ahead of the vehicle, and to calculate a predicted future vehicle velocity at a predetermined distance from a current vehicle position, or at a predetermined time from a current time, and to compare the current vehicle velocity and/or the predicted future vehicle velocity with the threshold velocities and, if the current vehicle velocity and/or the predicted future vehicle velocity exceeds one or more of the threshold velocities, determine a first point of activation based at least on the comparison, and to communicate with the user interface to issue a warning when the vehicle passes the first point of activation.

16. The vehicle driver assist arrangement according to claim 15 wherein the processor is adapted to determine a second point of activation based at least on the comparison, the second point of activation being further down the road in an intended direction of travel than the first point of activation, and if no hidden or at least partially hidden curve is detected, communicate with the user interface to issue a warning when the vehicle passes the second point of activation.

17. The vehicle driver assist arrangement according to claim 15 wherein the calculation of the plurality of threshold velocities is based on the road profile data and limitations in lateral and/or longitudinal acceleration of the vehicle.

18. A vehicle comprising a driver assist arrangement according to claim 14.

* * * * *